May 2, 1967

J. N. BAKER ET AL 3,317,804

VARIABLE SPEED INDUCTION MOTORS INCLUDING
PHOTOELECTRIC POSITION SENSING

Filed Sept. 7, 1965

INVENTORS
JAMES N. BAKER
JAMES F. BAKER
FREDDIE N. BAKER
WILLIAM R. GAZZAWAY

BY

Ely Silverman

ATTORNEY

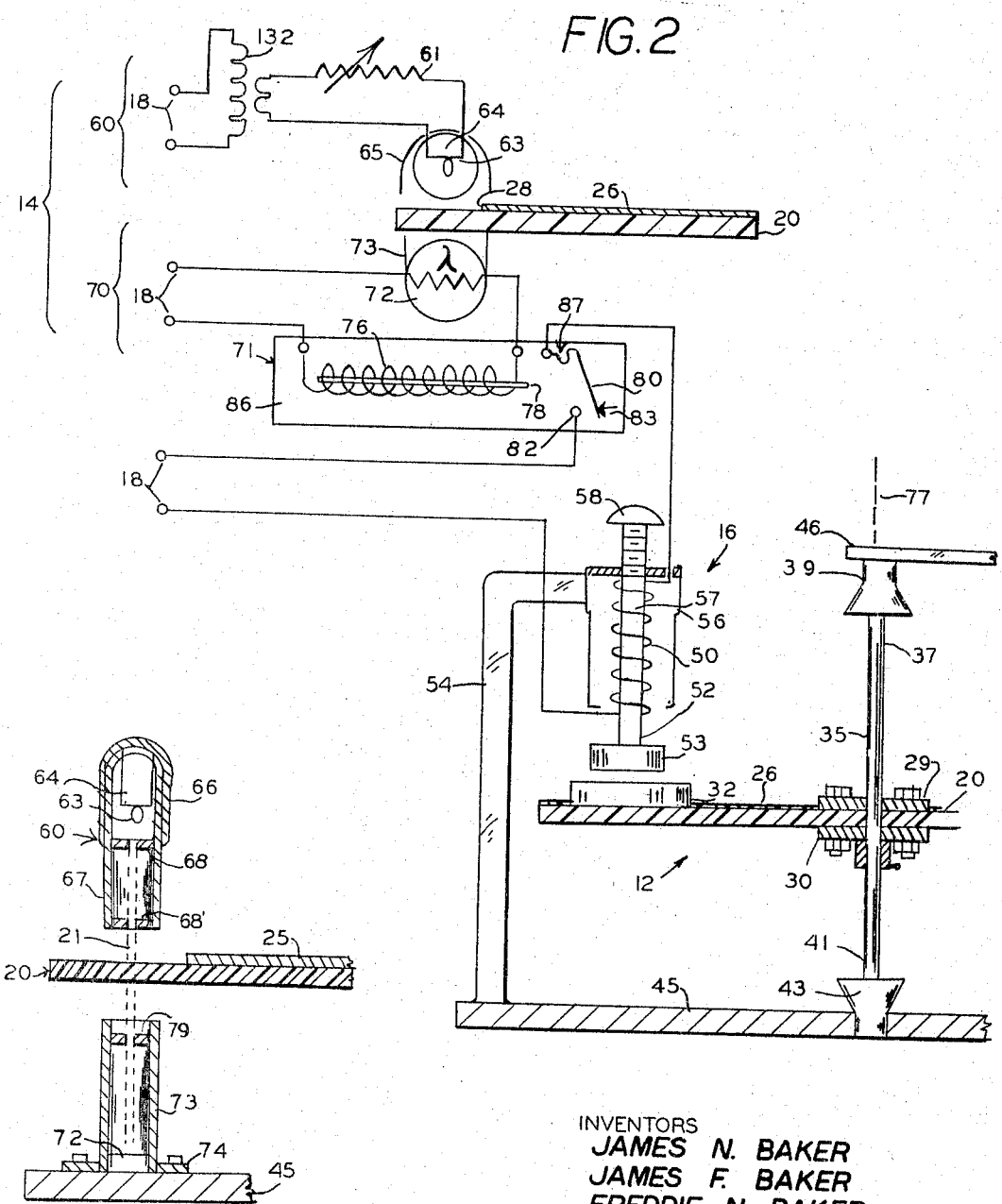

May 2, 1967
J. N. BAKER ET AL
3,317,804
VARIABLE SPEED INDUCTION MOTORS INCLUDING
PHOTOELECTRIC POSITION SENSING
Filed Sept. 7, 1965
7 Sheets-Sheet 3
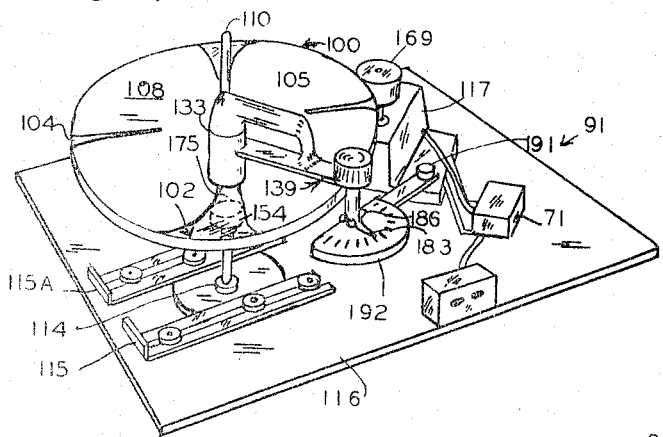
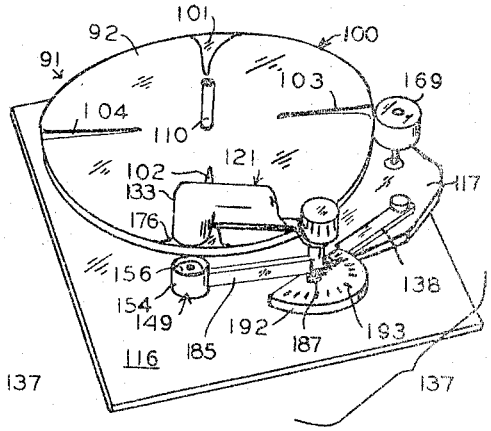
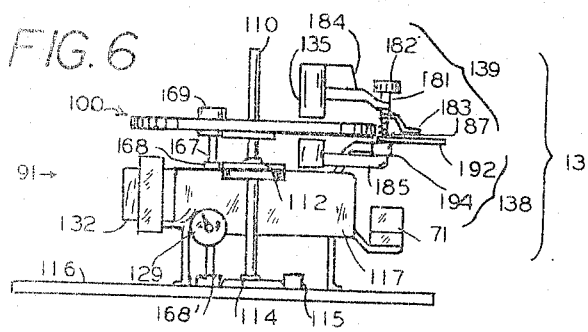
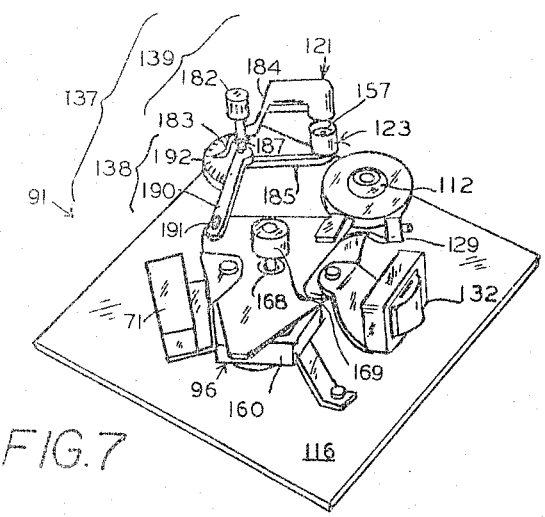
INVENTORS
JAMES N. BAKER
JAMES F. BAKER
FREDDIE N. BAKER
WILLIAM R. GAZZAWAY
BY
Ely Silverman
ATTORNEY

INVENTORS
JAMES N. BAKER
JAMES F. BAKER
FREDDIE N. BAKER
WILLIAM R. GAZZAWAY

BY
Ely Silverman
ATTORNEY

INVENTORS
JAMES N. BAKER
JAMES F. BAKER
FREDDIE N. BAKER
WILLIAM R. GAZZAWAY

BY
*Ely Silverman*
ATTORNEY

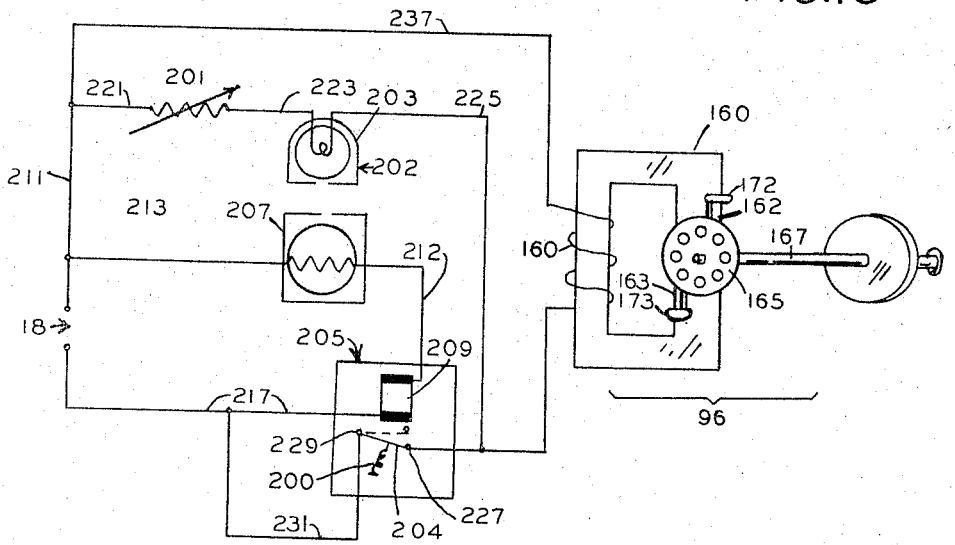
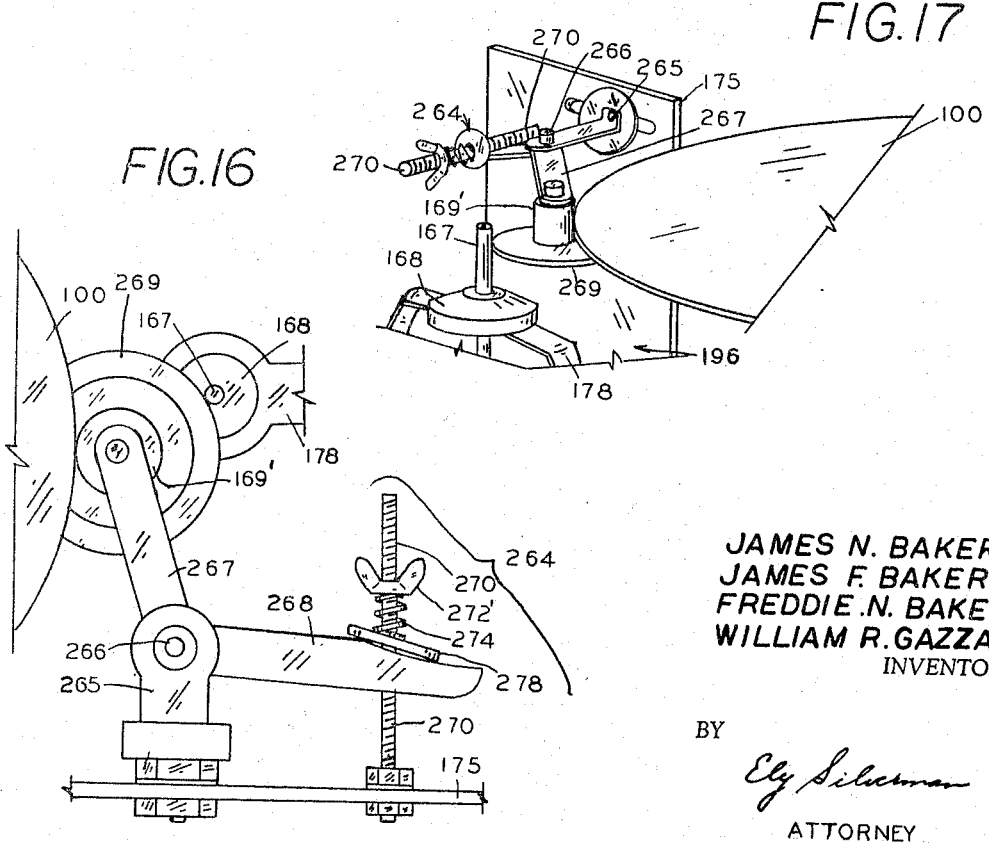

JAMES N. BAKER
JAMES F. BAKER
FREDDIE N. BAKER
WILLIAM R. GAZZAWAY
INVENTOR.

BY Ely Silverman

ATTORNEY

United States Patent Office 3,317,804
Patented May 2, 1967

3,317,804
VARIABLE SPEED INDUCTION MOTORS INCLUDING PHOTOELECTRIC POSITION SENSING
James Newton Baker, 4307 S. Polk St., and James Franklin Baker, 4011 S. Polk St., both of Amarillo, Tex. 79110; Freddie Newton Baker, 3305 Portland Road, Salem, Oreg. 97303; and William Raymond Gazzaway, 2413 Poplar St., Amarillo, Tex. 79107
Filed Sept. 7, 1965, Ser. No. 489,796
11 Claims. (Cl. 318—138)

This application is a continuation-in-part of our co-pending patent application Ser. No. 372,515 filed June 4, 1964.

This invention relates to variable speed motors actuated by alternating current. More particularly this invention relates to apparatus whereby to controllably vary the speed of induction motors actuated by standard constant-frequency alternating current.

Generally, speed control of induction motors is not easily obtained because the induction motor is inherently a constant-speed motor. Conventionally, switching connections have been used to obtain more than two speeds by changing the number of poles in the induction motor; however, to avoid these complicated switching connections, induction motors frequently have two distinct windings, each for a different number of poles. Such structures are expensive and particularly not adapted to fractional horsepower motors. While changing the "slip" can be accomplished by introducing resistance into the rotor circuit, the disadvantages of such arrangement are lowered efficiency and poor speed regulation, as well as complications in construction such as additional commutators.

Accordingly, one object of this invention is to produce a combination of an alternating-control motor with a speed control which is readily constructed and reliable in operation.

Another object of this invention is, accordingly, to provide speed control of fractional horsepower alternating-current motors with simple structures economically produced yet sturdy and predictable in their operation.

Another object of this invention is to produce motor-control adapters for attachment to alternating-current motors of the induction type.

Other objects of this invention will be clearly understood by those skilled in the art on a study of the below specification, of which specification the accompanying drawings form a part and in which drawings like reference numerals and characters represent like parts throughout all the drawings.

FIGURE 2 is an over-all wiring diagram of the apparatus of FIGURE 1;

FIGURE 3 is a detail of zone 3A of FIGURE 1, showing the relation of the photoelectric subassembly and the rotating element 20;

FIGURE 4 is a perspective view of another embodiment of this invention;

FIGURE 5 is a perspective view of the embodiment of the invention shown in FIGURE 4 in a different position of parts;

FIGURE 6 is a side view of the embodiment shown in FIGURE 4;

FIGURE 7 is a perspective view of the apparatus of FIGURE 4 partially disassembled;

FIGURE 13 is a schematic electrical circuit of another electrical control circuit and motor according to this invention;

Figures 14, 15:
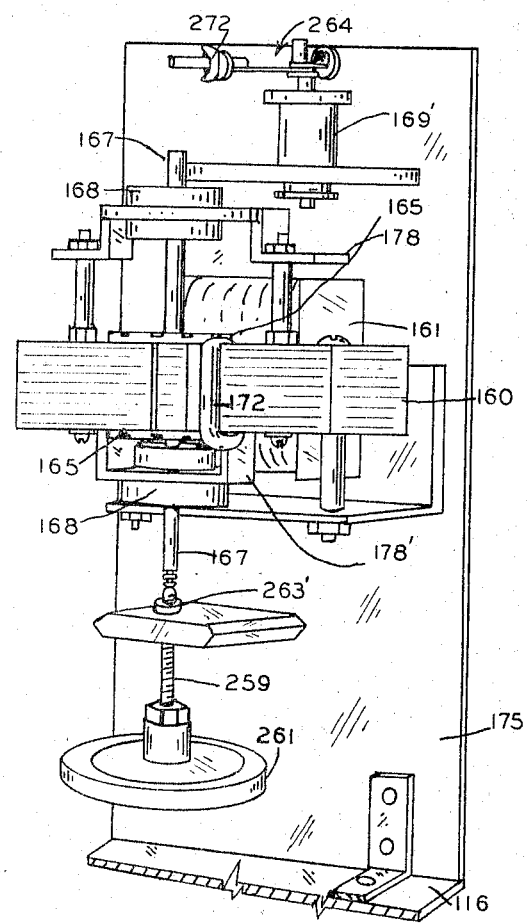

FIGURE 14 is a perspective view of a motor subassembly 196 for use in the combination of apparatus 91 of FIGURES 4 through 9 in the full speed position of the motor armature;

FIGURE 15 is a perspective view of a motor subassembly 196 for use in the combination of apparatus 91 of FIGURES 4 through 9 in a low speed position of the motor armature;

FIGURE 16 is an end view of subassembly 196 along direction of arrow 16 of FIGURE 15; and FIGURE 17 is a perspective detail view of the shaft 167 and related parts of motor 196 in relation to disc 100.

One feature of improvement in this application over our prior application is directed to a showing of a longitudinal axial movement of the rotor of the motor relative to a fixed stator of that motor. However, this invention also encompasses the relative longitudinal axial movement of stator and rotor of such a motor when the stator is moved axially longitudinally of a longitudinally fixed rotor.

Figure 1:
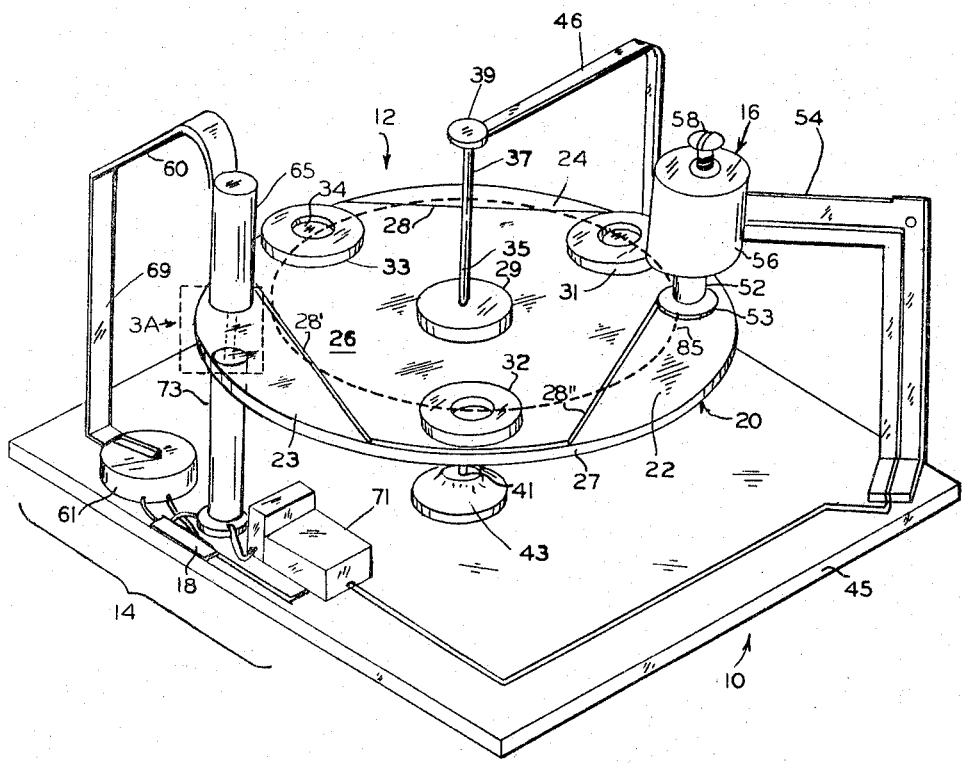
FIGURE 1 is an over-all perspective view of one embodiment of motor and control therefor according to this invention.

Generally, the aparatus 10 of FIGURE 1 comprises a rotating timer and rotor subassembly 12, a photoelectric relay subassembly 14, and an electromagnet stator subassembly 16. An alternating current power source 18 is connected to the subassemblies 14 and 16.

The rotating subassembly 12 comprises a flat, circular disc or plate 20, which rotating element has transparent portions 22, 23 and 24 and a centrally located, opaque portion 26. The rotating disc is, in the preferred embodiment of FIGURE 1, a transparent, cast methyl methacrylate disc 6⅜ inches in diameter and ¼ inch thick and smoothly polished on both sides. Portions 22, 23 and 24 are all of the same size and symmetrically located with respect to the center of the plate 20. The minimum diametral distance from edge 27 of the disc 20 to the chordal edge 28 of the opaque portion 26 adjacent portion 24 is 5½ inches in the embodiment of FIGURE 1, and the other chordal edges 28' and 28" are similarly located on plate 20. A plurality of annular, magnetically-susceptible steel rings 31, 32 and 33 are each firmly attached to and located on the top side of the plate or disc 20. The plate 20 is firmly supported for rotation in a horizontal plane by collars 29 and 30 on a rigid, vertical shaft 35. The shaft 35 is attached to and rotatably supported at its top end 37 in an upper steel bearing and socket 39, and at its lower end 41 in a lower steel bearing and socket 43. The bearing and socket 43 is supported on and attached to the base 45, which base also supports and is attached to the photoelectric relay subassembly and the electromagnet stator subassembly.

Socket 39 is firmly supported on an arm 46 the bottom of which is supported on base 45 and the top of which overhangs disc 20 and locates the upper end 37 of shaft 35 vertically above the lower end 41 of that shaft. The rings 31, 32 and 33 in the particular embodiment of FIGURE 1 are each a magnetically-susceptible soft steel annulus 1¼ inches in outer diameter and 3/16-inch thick, with an internal circular hole, 34, ⅜-inch in diameter. Shaft 35 is a rigid ¼-inch diameter steel shaft; disc 20 is attached thereto firmly by collars 29 and 30.

The electromagnet stator subassembly 16 comprises a helical coil 50, a core 52, a bracket 54 and coil and core housing or casing 56. The bracket 54 supports the casing or housing 56, a threaded nut 58 adjustably supports core 52 from the casing and within the helical coil 50. The coil 50 is also supported in the housing 56. The core 52 has an upper, narrow, cylindrical portion 57 which is ½-inch in diameter in the embodiment of FIGURE 1 and encircled by the coil 50. The core also has a lower, wider, shoe portion 53 extending below the coil 50. The shoe portion 53 is 1⅝ inches in diameter in the embodiment of FIGURE 1. Coil 50 has a 5,000 ohms D.C. resistance. Bracket 54 is supported on its bottom on the base 45 and it overhangs plate 20 and supports the center of the bottom of the core shoe in a position slightly (⅛-inch in the particular embodiment of FIGURE 1 herein described) above the circular path traversed by the center of the top of each of the rings 21, 22 and 23 about the center of shaft 35.

The photoelectric relay subassembly 14 comprises a light-emission source subassembly 60 and a photosensitive relay subassembly 70. The light-emission source 60 subassembly comprises generally a lamp, a housing and collimator therefor, a support for the housing, and a transformer and adjustable resistance electrically in series with the lamp.

More particularly, a conventionally controllable adjustable rheostat or resistance 61 is electrically connected at one end to a conventional step-down transformer 132 (which in turn is powered by a conventional source of A.C. power 18) and, at its other end, to a lamp 63. Lamp 63 is supported in a socket 64 fixed in the top of a cylindrical housing, 65, therefor. This housing 65 comprises an upper opaque hood portion 66 and a lower, opaque collimating portion 67. Portions 66 and 67 are continuous with each other. The upper hood portion 66 covers the top and sides of the lamp 63 but is out of contact therewith. The lower collimating portion 67 is cylindrical in shape and outline and has an internal orifice of ½-inch in diameter. Apertured opaque baffles 68 and 68′ on the interior of the housing provide for a cylindrical column of light 21 which column is ¹⁄₁₆-inch in diameter and paralleled to the central longitudinal axis 77 of the shaft 35 and 3 inches therefrom in the particular embodiment of FIGURE 1 herein described. A bracket 69 is supported and firmly fixed on the base 45 and supports the housing 65 and the socket 64.

The photosensitive subassembly circuit 70 comprises an electromagnetic relay 71 and a photosensitive cell assembly. The photosensitive cell assembly comprises a photoconductive cell 72 and a collimator housing 73 therefor, and a mounting 74 for the housing, whereby it (73) is firmly mounted on the base 45. The photoconductive cell 72 is electrically connected at one end thereof by wire to a source of power 18 and, at the other end of said cell, to the coil 76 of the conventional electromagnetic relay unit 71. The structure of the electromagnetic unit 71 is shown in somewhat more detail in FIGURE 2 than in FIGURE 9, but is the same structure in both embodiments herein illustrated and discussed.

The relay 71 comprises a conventional electromagnetic coil 76 and a core 78, a contact arm 80 and a contact point 82 mounted on a relay base 86. The arm 80 is in the magnetic path of the core 78 and is urged inwardly by the core toward the contact point 82 on passage of electric current through the coil 76. The arm 80 is, however, continually urged outward from point 82 toward an insulated rest point 83 by a resilient support 87 fixed to but insulated from the base 86 of the relay 71.

The current through the photoconductor cell 72 on illumination thereof by the conventional CM 43 type flashlight bulb which is located 3 inches from the photosensitive surface of cell 72 provides sufficient current through the relay 71, a conventional Sigma Relay 97638, to provide enough change in resistance of the circuit to close the contact arm 80 on point 82. This closes the circuit for the electromagnetic stator subassembly and passes current from A.C. source 18 (a conventional 110 volt A.C. source) to the coil 50, a 1½ inch long, approximately 5,000 ohms resistance coil. The core 52 therein is then actuated and serves to act on the masses 31, 32 and 33. The connections of the photoconductor cell, electromagnetic relay unit, electromagnetic stator unit, and light are as shown in FIGURE 2 for the particular embodiment shown in FIGURE 1.

The rotating disc 20 is rotatably supported, for rotation in a horizontal plane, on base 45 with the shaft 35 vertical and passing through the center of the disc 20 and the shaft rotatably mounted in the bearings and sockets 39 and 43 therefor.

The photoelectric source subassembly 60 and the photoelectric relay subassembly 70 are located on opposite sides of the plate 20. The mounting 69 for the photoelectric relay subassembly 14 is adjustable with respect to the axis of rotation 77 of the subassembly 12, which axis 77 passes through the longitudinal center of the shaft 35. The central longitudinal axis of the collimating portion 67 of the housing 65 and the apertures in the baffles therein are in line with the central longitudinal axis of the housing 73 of the photosensitive assembly 70 and the aperture in the baffle therein and the center of photosensitive surface of the photoconductor cell 72 lies on the central longitudinal axis of housing 73. A centrally apertured opaque baffle plate 79 in the housing 73 is likewise in line with a column of light 21 produced by the light 63 and the apertures in the baffles of the light-emission subassembly 60.

Figure 8:
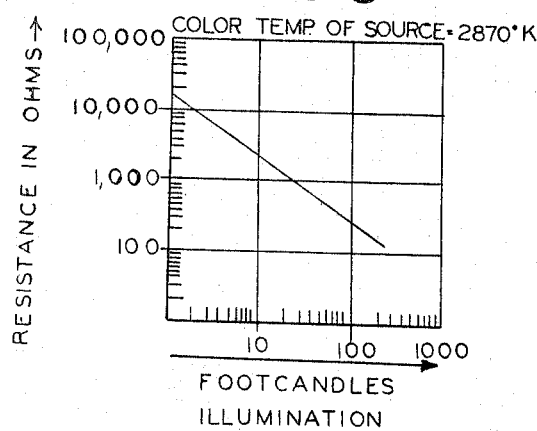
FIGURE 8 is a graphical representation of the electrical characteristics of a particular photoconductor used in the method and operation of the device of FIGURES 1 and 4.
Figure 12:
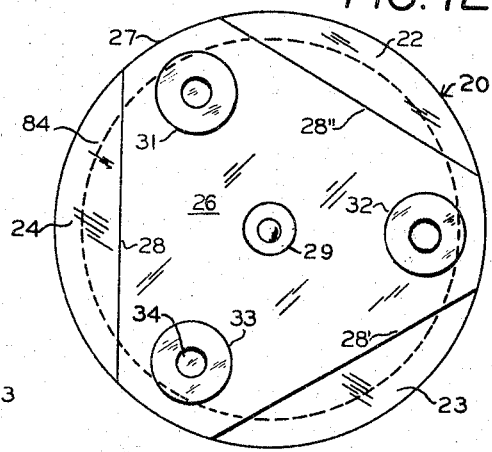
FIGURE 12 is a top plan view of the disc 20 of the apparatus of FIGURE 1.

In the embodiment of FIGURE 1, the plate 20 is divided into opaque and transparent portions. The magnets 21, 22 and 23, each of which is an annulus 1¼ inch in outer diameter and ³⁄₁₆-inch thick with an internal hole 34 at the center thereof, are located, as shown in FIGURES 1 and 12, on the opaque portion. The light generated by the bulb 63 passes freely through the transparent methyl methacrylate body of the disc 20. The photoconductor 72 is a Sylvania Conductor 8143 and its electrical characteristics are shown in FIGURE 8 attached hereto. The electromagnetic relay 16 is a Sigma Relay 97638. The D.C. core current required to close the normally open contact arm 80 is 3.5 milliamperes. The contact arm 80 opens at approximately 0.5 milliampere. On A.C. it will close at 60 volts and open at 56 volts. A Sigma FZ 5,000 ACG/BS1 may be used as an alternate. Contacts here are rated at 5 amperes A.C. current and 0.06 to 0.40 v.-a. The relay 71 has an overall size of 2¼ inches x 1¼ inches x 1⁵⁄₁₆ inches. The shaft 35 may be a darning needle 6 inches long. The pattern of opaque and transparent portions is as shown in FIGURES 1 and 12. The photocell 72 in the embodiment of FIGURE 1 is a Sylvania T-4 photoconductor having a ½-inch diameter surface on which a photoconductive pattern of cadmium sulfide is supplied.

The subassembly 12 rotates in its bearing supports relatively freely: it spins at 700 r.p.m. quietly and comes to rest from spinning at 1750 r.p.m. in 2 minutes. In operation a 60-cycle alternating current, 110 volt is applied across terminal 18. The disc 20 is initially rotated by hand to an r.p.m. of about 20 r.p.m. and at that time the rings 31, 32 and 33 travel in a path 85 which passes directly below the center of the shoe portion 53 of the core 52. At each setting of the rheostat 61 a constant and characteristic r.p.m. of subassembly 12 is reached, e.g., 70, 240, 600 or 750 r.p.m. as desired, and the path of the column of light 21 through the disc 20 which column links subassemblies 60 and 70 is shown in FIGURE 3. The path of the column of light 21 to and through the disc 20 is shown by the dashed line 84 in FIGURE 12.

The embodiment of this invention shown in FIGURES 4 through 7 is generally referred to as 91: it comprises a rotating disc subassembly 92, a photoelectric relay subassembly 94, an electromagnetic motor subassembly 96 and a power source therefor, 18.

Figure 9:
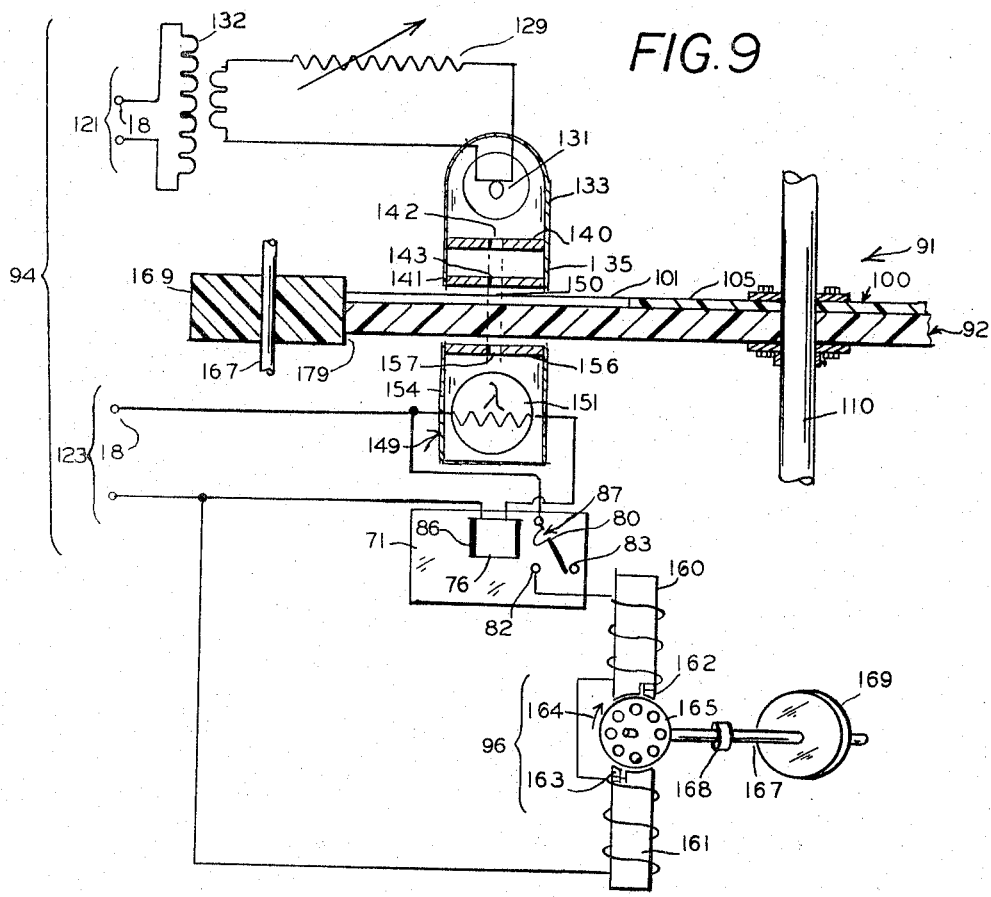
FIGURE 9 is a wiring diagram of the apparatus of embodiment also shown in FIGURE 4.
Figure 11:
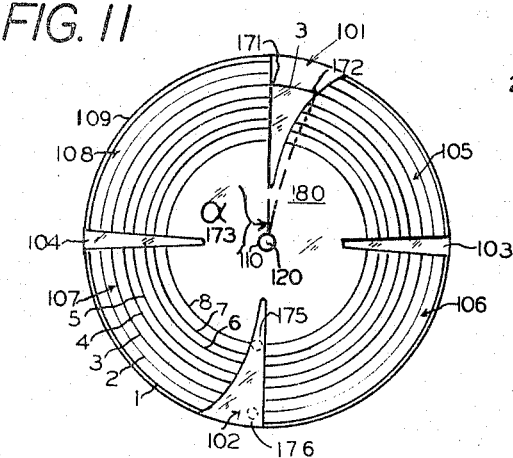
FIGURE 11 is an enlarged plan view of the disc 100 of the apparatus of FIGURE 4.

The rotating disc subassembly 92 comprises a flat, circular, horizontal disc 100 made of transparent rigid material, such methyl methacrylate, ¼-inch thick and 5½ inches in diameter. On the top surface of the disc 100 is firmly attached an opaque layer 180 in the form of a lobed disc provided with slots 101, 102, 103, 104 passing completely through lobed disc 180. These slots are symmetrically arrayed about the center of the disc 100. This provides a rotating disc 100 with transparent portions 101, 102, 103, and 104 and opaque portions 105, 106, 107, and 108 therebetween as shown in FIGURES 4, 5 and 11 and extending to the edge 109 of the disc 100. The circular disc 100 is firmly supported on a vertical shaft 110 passing through the geometric center of the disc 100. This shaft is supported in an intermediate sleeve bearing 112 and a foot bearing 114. Bearings 112 and 114 are roller bearings. The wiring diagram of the particular embodiment of apparatus shown in FIGURES 4 through 7 is as shown in FIGURE 9. The lower bearing 114 is adjustably fixed to base 116 and the bearing 112 is adjustably fixed to the motor frame 117 which motor frame is itself firmly affixed to the base 116. The shaft and disc rotate about the longitudinal axis 120 of the shaft 110.

The photoelectric relay subassembly 94 comprises a light source subassembly 121, a photosensitive relay subassembly 123 and a movable supporting bracket subassembly 137.

The light source subassembly 121 comprises an adjustable rheostat 129 supported on the frame 117 and connected through a standard step-down transformer 132 to an A.C. power source 18, a lamp 131 electrically connected to the rheostat, and a lamp housing 133. The lower portion of the housing 133 forms a collimating portion 135. This collimating portion is provided with a plurality of apertured opaque baffles as in the apparatus shown in FIGURE 3. The housing 133 and lamp are firmly attached to and supported on the upper arm 184 of a compound arm 139.

The support subassembly 137 comprises a fixed arm subassembly 138 and a movable compound arm 139. The compound arm 139, upside down, is in the shape of an F combined with T lying on its side and with the F vertical stroke paralled to and continuous with the normally horizontal bar of the T. In the particular embodiment of the invention which is shown in FIGURE 4, the movable compound arm 139 comprises a vertical, central shaft 181 with a knob 182 at its upper end. An indicator arm 183 projects outward from one side of the shaft 181. An upper, light-emission source support arm 184 projects from the shaft 181 in the opposite direction to the indicator arm and a, lower, photoelectric cell support arm, 185, projects generally parallel to and in the same vertical plane and in the same direction as arm 184 from the shaft 181 for support of the photosensitive cell 151 and its collimator tube 155. Arms 183, 184 and 185 are all firmly attached to shaft 181 and rotate together therewith.

The fixed arm subassembly 138 comprises an upper, fixed arm 190 which is rigid. Arm 190 is firmly attached, as by bolt 191 to the motor frame 117. A dial plate 192 is firmly attached to and supported on the other, outer end of the arm 190. This dial plate is provided with a set of numbers, as 193, or other indicatrices for location of the arms 184 and 185 in any desired location. The outer end of the arm 190 also supports a shaft socket 194 within which the shaft 181 is firmly and rotatably located.

A shoulder 186 is provided at the bottom of the indicator and a spring 187 is located between the plate 192 and the shoulder 186. This spring is maintained under compression and provides for firmly yet adjustably locating the angular position of the arms 184 and 185 with respect to the arm 190. In the preferred embodiment of FIGURE 4 herein described, the distance from the center of the shaft 181 to a column of light 150 provided by the emission subassembly 121 is 2 inches, the length of the arm 190 is 3 inches and the circular plate 192 has a diameter of 1¾ inches which allows the numbers thereon to each be about ¼-inch in size.

The photosensitive relay subassembly 123 comprises an electromagnetic relay subassembly 71 and a photoconductor cell subassembly 149. Photocell subassembly 149 comprises a photoconductor cell 151, collimator tube 154, baffles therein and wires from cell 151 to the relay subassembly and source 18. Cell 151 is supported on the lower arm 185 of the compound arm 139. The photoconductor cell 151 is attached to and supported at the bottom of a closed-bottom, open-topped cylindrical opaque collimator tube 154. The collimator tube is provided with a centrally apertured opaque baffle 156, the aperture 157 of which baffle passes to photoconductor 151 the column of light 150 from the luminous light-emission source or lamp 131. The arm 185 supports the collimator tube 154 in a fixed optical relationship with the collimator portion 135 of the light source subassembly 121 although the position of the beam of light 150 may be readily adjusted from a position as 175 at the inner portion of disc 100 to its outer portion, as 176, near to edge 109 or lateral of edge 109 depending on the speed of motor subassembly 96 desired.

The collimating portion 135 is provided with a plurality of apertured opaque baffles as 140 and 141, the apertures of which, 142 and 143 respectively, define a vertical cylinder of light 150 which links the light source subassembly 121 and photosensitive relay subassembly 123.

The relay 153 is connected at one end to the photoconductor 151 and, at its other end to the power source 18.

The axis of the collimating portion 135 is defined by the apertured baffles in that collimating portion which define the vertical axis of the cylindrical beam of light 150. The center of that cylindrical beam of light is the central axis of the collimating portion 135. The apertures are each circular and ⅟₁₆-inch diameter in the embodiment of FIGURE 4. Similar sized apertures define the optical axis in the lower collimator tube 155: arms 184 and 185 firmly support the subassemblies 121 and 123 in such relationship.

The relay 71 comprises an electromagnetic coil and control arm with the control arm actuated by a resilient spring element to keep the circuit open except when the photocell is activated. In the particular embodiment of apparatus shown in FIGURES 4 through 11 herein described this is the Conventional Sigma 97638 relay or 41 FZ 5,000 ACG/SIL (described in Allied Radio Company Catalogue, 210A, 1962, p. 128), above described.

While the above electrical structure for the apparatus of FIGURES 4 through 11 is generally similar to the embodiment of FIGURES 1 through 3, in the apparatus of FIGURES 4 through 11 in lieu of magnets on disc 20 and a single electromagnetic stator subassembly, a motor subassembly 96 is provided. This is a single-phase shaded pole induction motor. In the particular embodiment herein described for FIGURES 4 through 11, the motor 96 is a ⅟₁₀₀ hp. motor, conventionally running free at 1740 r.p.m. when it draws 0.3 ampere at no load. The same motor draws 0.5 ampere at 1600 r.p.m., as well as in the locked position of the rotor, such measurement being taken when the motor is powered with a conventional 110 volt A.C. line wherein the power factor is 0.88. The motor subassembly 95 comprises a conventional rotor 165 and stator 160; the stator is provided with a conventional coil 161 and shaded poles 162 and 163 for rotor rotation in the counterclockwise (as shown in FIGURE 9) direction 164. The rotor 165 of the motor is directly attached to and supported by a ¼-inch diameter straight steel shaft 167. The shaft is supported at its upper and lower ends in conventional bearings as 168 and 168' respectively. A cylindrical control wheel 169 is centered on and firmly affixed to the shaft 167. The control wheel 169 in the embodiment of FIGURE 4 has an outside diameter of 1 inch and an axial length of ½ inch. The outer edge 179 of the control wheel 169 contacts the outer edge 109 of the disc 100, and accordingly, drives the disc 100. Adjustment of the base bearing 114 is provided by its support in the adjustable slides 115A and 115B. This support of bearing 114 adjustably provides for an adequately firm contact for the disc 100 to contact and be driven by the wheel 169 and vice versa, inasmuch as the disc 100 provides a flywheel effect as well as a sufficiently delicate contact to avoid binding of the shafts 167 and 110.

The opaque portion 180 of the rotating disc 100 has cutout portions over areas 101, 102, 103 and 104. These portions are transparent, permitting light to pass through such portions, and widen as they extend radially to the edge 109. Opaque lobular portions 105, 106, 107 and 108 are separated by the transparent portions and extend from the center of disc 100 to its edge 109. FIGURE 11 shows a layer or sheet 180 made of apaque cardboard about 1/50-inch thick: layer or sheet 180 is multi-lobed, symmetrical about its center and attached onto the circular disc 100 by glue or by double-faced masking tape. FIGURE 11 shows each of several successively radially inner circular paths, 1, 2, 3, 4, 5, 6, 7 and 8 for the beam of light 150. The drawing of these paths 1, 2 and 4-7 are shown as interrupted by the transparent portions 101, 102, 103 and 104 but the actual path continues over such portions. Taking $\beta$ as the linear distance along any one particular circular path, as 3, of the cylinder of light 150 on the rotating disc 100 from one edge, 171, to the other edge, 172, of such path over each of the transparent portions, as 101, of disc 100, and $\alpha$ as the angle 173 expressed in radians which such pair of edges form relative to the axis 120, and $r$ as the distance of the path, as 3, from the axis 120 of rotation of shaft 110, then $\alpha \times r = \beta$. However, in the paths 1 through 8 as shown in FIGURE 11, $\beta$ increases more rapidly than does $r$ for each of the successively radially outer paths as 8 through 1 over the transparent sections 101, 102, 103 and 104. This provides for successively longer amounts and times of light-transmitting paths at a given rate of rotation of disc 100 with a pattern of opaque portions as in FIGURE 11 as one moves radially outward from an inner position, as 175, to an outer position as 176 in each of the transparent portions as 102.

At a fixed intensity of light along beam 150 from emission source 131 and at a fixed rate of rotation of subassembly 92, the time during which light is transmitted from subassembly 121 to subassembly 123 during each revolution of disc 100 (with layer or sheet 180 attached thereto) increases as assembly 121 and assembly 123 are moved outward together from a position as over inner zone 175 as shown in FIGURES 4 and 11 to an outer zone as 176 as shown in FIGURES 5 and 11.

The motor 96 when running free in the general apparatus arrangement as shown in FIGURE 7, will run at its normal free-running speed of 1740 r.p.m.; it will come to a dead stop in 10 seconds exactly of the time of shutoff of power support to that motor due to mechanical friction and other losses. When the rotating subassembly 92 is connected with the edge 109 of disc 100 contacting the shaft control wheel 169 and the power is cut off, the speed of the apparatus falls from 1750 r.p.m. of wheel 169 to zero r.p.m. in 5 seconds. Subassembly 92 will spin for 40 seconds before coming to a dead stop when initially spun at 700 r.p.m. The weight of the disc 100 is 4 ounces; however, its mount of inertia is substantial relative to the small wheel 169 and the rotor 165 and the disc 100 serves as a flywheel for wheel 169 and rotor 165. Accordingly, although the motor 96 be periodically shut off and turned on in varying amounts depending on the position of the outer end of the arms supporting the subassemblies 121 and 123, the power comes back into the motor within a fraction of one complete cycle of the rotating disc 100 and, inasmuch as the motor is of the self-starting variety and the disc 100 serves as a flywheel, the speed of motor 96 is kept at a constant level depending on the position of the subassemblies 121 and 123. The position of subassemblies 121 and 123 are determined by the position of the knob 182 and the indicator 183 for the movable compound arm 139. The speed of motor 96 is thus kept at a constant level depending on the position of the support arms for subassemblies 121 and 123 and the intensity of the light along the beam 150. The control arms supporting the subassemblies 121 and 123 are readily set at the desired position on the dial plate 192 and accordingly the speed of that motor is set readily at such value as is desired to be obtained. In a particular embodiment shown in FIGURE 4, the relationship of the rotative speed of the motor, the location of the beam of light 150 measured by its radius $r$ from the axis 120 of the shaft 110 as determined by the relation of the beam 150 and the paths 1-8 on disc 100, and the length of path $\beta$ over the transparent portions of the subassembly 92 are as given in Table I.

TABLE I.—(DATA FOR FIGURE 10)

| Path No. | Speed in r.p.m. (±20) | Radius in cm. (±0.03) | Lengths of Path (in mm.) | | | | Total $\beta$ (±1.0) |
|---|---|---|---|---|---|---|---|
| | | | Portions | | | | |
| | | | 101 (±0.3) | 102 (±0.3) | 103 (±0.3) | 104 (±0.3) | |
| 1 | 1,700 | 6.8 | 2.5 | 2.5 | .7 | .7 | 6.4 |
| 2 | 1,375 | 6.4 | 1.6 | 1.9 | .5 | .6 | 4.6 |
| 3 | 1,100 | 5.9 | 1.2 | 1.5 | .45 | .45 | 3.6 |
| 4 | 780 | 5.5 | 0.9 | 1.1 | .45 | .40 | 2.85 |
| 4½ | 650 | 5.3 | | | | | |
| 5 | | 5.1 | .9 | .9 | .3 | .3 | 2.4 |
| 5½ | 500 | 4.9 | | | | | |
| 6 | 430 | 4.7 | .7 | .75 | .3 | .3 | 2.65 |
| 7 | 350 | 4.3 | .65 | .60 | .25 | .25 | 1.75 |
| 8 | 300 | 3.9 | .45 | .5 | .25 | .2 | 1.4 |

Figure 10:
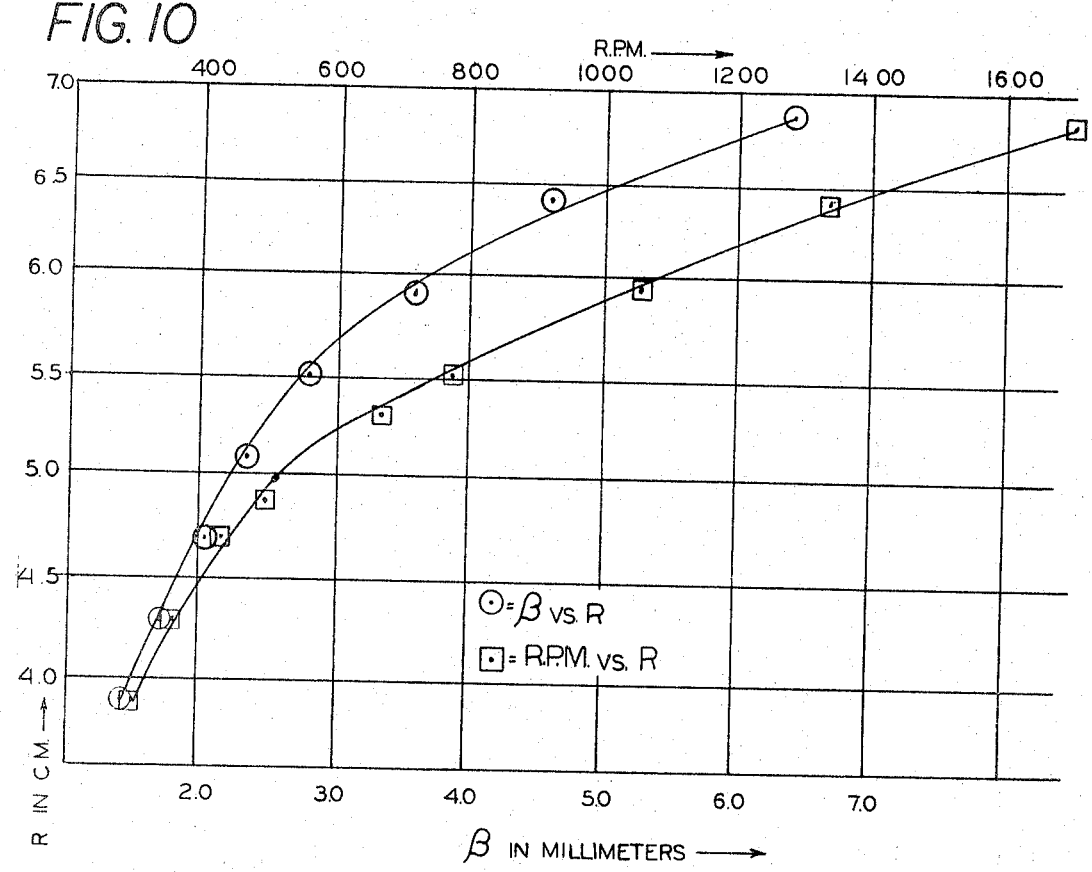
FIGURE 10 is a graphical representation of the motor speed and control arm location for the apparatus of FIGURE 4.

This data of Table I is graphed in FIGURE 10 to show the effective correlation of the motor speed (measured as r.p.m.) and position of the light beam 150 of the apparatus of FIGURE 4, all these measurements being taken with a fixed intensity of light. The amount of light may be increased if needed to correct for variations in sensitivity of the photoconductor and variations in relay sensitivity.

This apparatus of FIGURES 4 through 11 of this invention thus provides for varying the speed of fractional horsepower induction motors inexpensively and without wearing switches or brushes. The motor 96 may be replaced by a conventional capacitator motor. Also, the motor may be provided with conventional manner, e.g., Harwood, Control of Electric Motors, John Wiley & Sons, 1936, p. 163 or Gray and Wallace, Principle and Practice of Electrical Engineering, McGraw-Hill, 1962, p. 446. These motors may be used where variable speed fractional horsepower motors are required such as in educational devices, sewing machines and chemical control processes.

Further still, it is within the scope of this invention that the matter auxiliary to the motor, namely, the rotating subassembly 92 and the photoelectric subassembly 94 may be sold separately as a kit to form the combination covered and discussed within the specification and drawings.

The circuit of FIGURE 13 shows another embodiment of an A.C. motor control. The circuit comprises an adjustably variable resistance element 201 (identical with 129) a light source 203 (identical with light source 131) and a relay 205 generally the same as 71, but with its contact arm 204 normally closed, the standard 110 volt A.C. source 18, the photocell 207 (like 151) and a self starting A.C. motor as 96 or 196. A standard line of electroconductive wire 211 connects one terminal of the A.C. voltage source 18 to the line 213 which leads to the cell 207; electroconductive wire line 215 passes from cell 207 to the coil 209 of the normally closed relay 209 and the other end of coil 209 is connected by the line 217 to the other terminal of the A.C. power source 18. The line 211 also leads to the line 221 which connects to one end of the adjustable resistance 201; a line 223 leads from the other end of that resistance to the light source, 203. A line 225 leads from the other end of element 203 to contact point 227 of the relay 205; the other contact point 229 of the relay switch connects by line 231 to the line 217 and source 18. Line 235 is joined to 225 and connects to one end of the self starting A.C. motor subassembly 96 while another line 237 is connected to line 211 and leads to the other end of the subassembly 96.

In operation the contact arm 204 of relay 205 is normally closed across points 227 and 229. When light 203 is turned on it actuates the photocell 207; the actuation of the photocell actuates the relay coil 209 and breaks the light circuit. As the light turns off the photocell and relay coil circuits are deactivated. This permits the normally closed contact arm 204 of the relay 205 to again return to the closed position shown in FIGURE 13. This pattern of switching on and off will continue as long as there is voltage across the source 18. The speed at which the switching on and off is controlled by adjusting the intensity of the light in relation to the photocell by adjustment of the variable resistance 201. When the light 203 does no shine full power goes through arm 204 and the relay contacts 229 and 227 of relay 205. This allows the motor 96 to run at full speed. As the intensity of the light beam from light 203 (corresponding to light beam 150 of subassembly 121) increases the photocell starts actuating the relay coil 209; this cuts down the speed of the A.C. induction motor 96. By this means all types of electrical induction and synchronous motors can be controlled with speed ranges from maximum to a standstill. As the speed of the motor decreases the amperage drawn thereby decreases accordingly. However, the voltage remains the same across the motor. This method has been used satisfactorily in very small synchronous motors, on similarly small shaded pole motors, and on capacitor start induction motors. It is an ideal control for power hand tools and power appliances. A spring 200 normally holds the arm 204 of the relay 205 in closed position as shown in FIGURE 13. At any particular adjustment of the spring the frequency of cutoff is directly dependent on the adjustment of the adjustable resistance rheostat 201.

The apparatus 196 of FIGURES 14–16 provides that the rotor 165 of subassembly is adjustable along the length of the axis of its shaft 167. The particular embodiment of motor, 196, comprises a conventional rotor 165 and a C-shaped laminated stator 160 and its coil 161. The coil 161 is firmly mounted on the stator and the stator is in electromagnetic path of the flux developed by the coil. Each of a pair of copper rings 172 and 173 each made of ⅛-inch diameter wire each are wound about one side of one end of the stator to provide, respectively, the shaded poles 162 and 163 (as is also the case in the embodiment 96 above described). The bearings 168 and 168' rotatably support the shaft 167 and are both firmly supported by brackets 178 and 178', respectively, which brackets are firmly affixed to and supported on the stator 160. The stator 160 is firmly mounted on a rigid plate 175. Plate 175 is firmly mounted on base 116 of the assembly 91. A rotor shaft adjustment assembly 250 is also firmly attached to the plate 175. Subassembly 250 comprises a bracket 252 which, at one end thereof 255, is firmly attached to the plate 175 and, at the other end thereof is located a hollow helically threaded portion 257. A helically threaded adjustment shaft 259 engages and fits into the hollows of the threaded portion 257 of the bracket 252. The threaded shaft has an adjustment handle 261 at its lower end which handle is firmly affixed to the shaft; lock nuts 263 and 263' provide for firm location of the shaft 259 relative to the bracket 252.

The shaft 167 is freely rotatable in and also movable longitudinally in the bearings 168 and 168'. The shaft 167 is coaxial with the threaded shaft 259; accordingly the movement of the handle 261 up and down relative to the bracket 252 caused by rotation of handle 261 and vertical motion of shaft 259 results in movement of the shaft 167 up and down. In the lowermost position of the handle 261 the rotor is, as shown in FIGURE 14 located with the midpoint betweeen the top and bottom of the rotor and the same vertical level as the midpoint between the top and bottom of the stator; the rotor 165 is then in the middle of the magnetic field created by the stator 160 and its coil 161. However rotation of the handle 261 moves the rotor 165 upward and out of the space provided in the stator for rotation of the rotor and the maximum magnetic flux therethrough.

A transmission subassembly 264 is firmly attached to the plate 175. The transmission subassembly comprises a pivot mounting 265, which supports a pin 266 the axis of which is parallel to length of shaft 167 and on which rigid arms 267 and 268 pivot. Arms 267 and 268 are firmly attached to each other in a fixed relationship with each other; a spring 274 at the end of arm 268 is partly held in place by a washer 278. The washer 278 is held in position relative to the plate 175 by a threaded shaft 270 which is firmly affixed to the plate 175. At its base, the shaft 270 is firmly affixed to plate 175 by a conventional nut bolted to the plate 175 and is provided at a point spaced away from its base with an adjustable wing nut 272 and the spring 274. The spring 274 bears on the washer 278 urging the left end of the arm 268 as seen in FIGURE 16 downward. This urges arm 267 to rotate in a counterclockwise direction as shown in FIGURE 16. The arm 267 at its outer end, distant from the pin 266 supports a pin 268 about which the cylindrical drive wheel 169' turns. The drive wheel 169' is similar to wheel 169 and is firmly attached to a drive wheel 269. The drive wheel 269 is made of rubber and resiliently contacts the shaft 167. Accordingly the shaft 167 transmits to the wheel 269 and the wheel 269 transmits to the wheel 169 and disc 100 energy of rotation of the motor 196 of which shaft 167 is a part.

The wheel 169' contacts the disc 100 in the same manner as above discussed for wheel 169. As shown in FIGURE 17 the motor 196 is mounted on the plate 116 in lieu of the motor 96 as shown in FIGURES 4–7. Thereby this motor 196 serves to drive the disc 100 as controlled by not only the knob 182 on the arm 139 but also the handle 261 provides for further adjustment of the speed of the motor. By this improved subassembly 196 the r.p.m. of the motor may be slowed controllably and gradually from the data shown in FIGURE 10 and Table I down to a complete standstill. Speeds of 20 and 30 r.p.m. are very readily and reliably obtained when the rotor 165 is in the extended position as shown in the FIGURE 15. Accordingly by the use of the subassembly 196 in combination with the rest of the assembly 91 the r.p.m. values may be reliably brought down from 1700 r.p.m. very readily and controllably to 20 r.p.m. without gears. Accordingly by this invention an inexpensive yet reliable apparatus is provided which allows for a speed control ranging from 20 r.p.m. to 1600 r.p.m. with extremely simple apparatus and only one or two adjustments required therefor. Table II gives data on the motor 195.

*Table II.—Motor 195 characteristics*

| | |
|---|---|
| Stator height _____in__ | 2½ |
| Stator width _____in__ | 2 |
| Stator depth _____in__ | ⅝ |
| Horsepower (approximate) _____ | 1/100 |
| Axial movement of wheel 261 _____in__ | ½ |
| Speed, maximum _____r.p.m. (±5%)__ | 1700 |
| Speed, minimum _____r.p.m.__ | 5 |
| Shaft 167 diameter _____in__ | ⅛ |
| Source 18 _____volts__ | 110 |

Although, in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative, that this invention is not limited thereto and, accordingly, alterations and modifications which readily suggest themselves to persons skilled in the art without departing from the true spirit of the disclosure hereinabove are intended to be included in the scope of the annexed claims.

We claim:

1. A variable speed induction motor comprising:
   (a) a base, a coil, a support for said coil mounted on said base and said coil mounted thereon, a rotor rotatable about a first axis, bearings for said rotor, at least one of which bearings is supported on said base, a shaft attached to said rotor, and a cylindrical bearing wheel supported on said shaft exterior to said rotor; the cylindrical axis of said cylinder coaxial with the center of said shaft;
   (b) a circular disc rotatable about an axis, the edge of said disc contacting the edge of said bearing wheel and in driving relationship thereto, an opaque and a transparent portion on at least one surface of said disc;
   (c) a luminous emission source, a collimator surrounding said luminous emission source, and a support therefor; a photosensitive electric means and a support therefor, a collimator for said photosensitive electrical means, said collimators having a common optical axis;
   (d) a relay comprising an electromagnetic coil, a switch and switch contacts, said relay coil being in series with the photosensitive means and a voltaic source, the switch and switch contacts being in series with said coil;
   (e) a beam of light linking the luminous source and the electrically photosensitive element; and a support for said light emission source and said photosensitive source, one end of said support being movable between the periphery and the center of said rotatable disc whereby the beam of light connecting said luminous emission source and the photosensitive source is movable between the periphery of said disc and a more central portion of said disc.

2. Apparatus as in claim 1 wherein said luminous source and said photosensitive source are on opposite sides of said disc.

3. Apparatus as in claim 2 wherein said beam intermittently passes through the transparent portions of said disc and the path of the beam passes through a circular path having a center on the central axis of said disc and comprising circular arcs over the opaque and transparent portions, the length of said circular arcs over the transparent portions increasing progressively with increased distance from the center at a greater rate than the radius of the arcs.

4. Apparatus as in claim 3 wherein $\beta = \alpha r^n$ where
   $\beta$ is the distance along the circular path from one edge of a transparent portion of the disc to the other over a transparent portion of the disc;
   $\alpha$ is the angle expressed in radians from one end of the path $\beta$ to the other;
   $r$ is the distance from the path $\beta$ to the axis of rotation of the disc, and
   $n$ is a number greater than one.

5. Apparatus as in claim 3 where the motor is a self-starting motor.

6. Apparatus as in claim 3 wherein the motor is a shaded pole, single-phase induction motor.

7. Apparatus as in claim 4 wherein the motor is a fractional horsepower motor having a horsepower of about 1/100 horsepower.

8. Apparatus as in claim 5 provided with means for adjustment of the intensity of the light emission source connected to said light.

9. Apparatus as in claim 8 wherein the means for adjustment of the light is a rheostat connected between the light and the voltaic source therefor.

10. A variable speed induction motor comprising:
   (a) a base, a coil, a support for said coil mounted on said base and said coil mounted thereon, a rotor rotatable about a first axis, a shaft attached to said rotor, and a cylindrical bearing wheel supported on said shaft exterior to said rotor; the cylindrical axis of said cylinder coaxial with the center of said shaft;
   (b) a circular disc rotatable about an axis, the edge of said disc contacting the edge of said bearing wheel and in driving relationship thereto, an opaque and a transparent portion on at least one surface of said disc;
   (c) a luminous emission source, a collimator surrounding said luminous emission source, and a support therefor; a photosensitive electric means and a support therefor, a collimator for said photosensitive electrical means, said collimators having a common optical axis;
   (d) a relay comprising an electromagnetic coil, a switch and switch contacts, said relay coil being in series with the photosensitive means and a voltaic source, the switch and switch contacts being in series with said coil;
   (e) a beam of light linking the luminous source and the electrically photosensitive element; and a support for said light emission source and said photosensitive source, one end of said support being movable between the periphery and the center of said rotatable disc whereby the beam of light connecting said luminous emission source and the photosensitive source is movable between the periphery of said disc and a more central portion of said disc, and
   (f) a stator in said coil, spaced apart poles in said stator, said rotor located between said poles of said stator, bearings for said shaft of said rotor, said rotor shaft being rotatably seated in said bearings, said shaft being supported on means adjustably located along the length of said shaft.

11. Apparatus as in claim 1 comprising also a first series circuit comprising an adjustable electrical resistance, a light emission means and a switch means, a second series circuit including said switch means and connected to said coil on said stator, a third series circuit comprising a light sensitive cell whose electrical resistance falls on illumination thereof and a relay coil with an electromagnetic flux that links with and acts on the switch means, said switch means being normally closed, said switch means being movable to an open position on actuation of said relay coil means, said three series circuit each being connected at one end thereof to the same terminal of an A.C. voltage source.

References Cited by the Examiner

UNITED STATES PATENTS

| | | | |
|---|---|---|---|
| 2,968,756 | 1/1961 | Devol | 318—480 |
| 2,986,689 | 5/1961 | Hofer | 318—480 |
| 3,025,443 | 3/1962 | Wilkinson et al. | 318—138 |
| 3,096,467 | 7/1963 | Angus et al. | 318—138 |
| 3,204,165 | 8/1965 | Kreutzer | 318—138 |
| 3,239,741 | 3/1966 | Rank. | |

ORIS L. RADER, *Primary Examiner.*

G. SIMMONS, *Assistant Examiner.*